United States Patent [19]

Blanc

[11] 3,805,647

[45] Apr. 23, 1974

[54] DEVICE FOR CUTTING HOLLOW CYLINDRICAL OBJECTS SUCH AS BOTTLES AND THE LIKE

[75] Inventor: Yale A. Blanc, Glencoe, Ill.

[73] Assignee: Martin Yale Industries, Inc., Chicago, Ill.

[22] Filed: Aug. 11, 1972

[21] Appl. No.: 279,823

[52] U.S. Cl............ 82/84, 82/92, 82/101, 225/2
[51] Int. Cl......... B23b 3/04, B23b 5/14, B26f 3/00
[58] Field of Search........ 82/46, 84, 92, 101; 225/2, 225/96, 96.5; 30/164.9, 164.95

[56] References Cited
UNITED STATES PATENTS

| 3,699,829 | 10/1972 | Gelfman | 82/92 |
| 3,572,564 | 3/1971 | Fleming | 225/2 |
| 2,224,354 | 12/1940 | Maxwell | 225/2 |
| 3,406,599 | 10/1968 | Horton | 82/101 |
| 2,618,997 | 11/1952 | Fellroth | 82/39 |
| 1,059,225 | 4/1913 | Sherrill | 82/39 |
| 443,847 | 12/1890 | Ewald | 82/38 |
| 371,062 | 10/1887 | Hayes | 82/38 |
| 2,440,402 | 4/1948 | Horberg | 82/38 |

Primary Examiner—Harrison L. Hinson
Attorney, Agent, or Firm—Max R. Kraus

[57] ABSTRACT

A device for cutting hollow cylindrical glass objects such as bottles and the like comprising, a base, front and rear support means for supporting the cylindrical object in a horizontal position, said rear support means being adjustable axially with respect to the front support means, the front support means comprising a pair of members which are adjustable relative to each other, with one of said front support means supporting a cutting element and said front adjustable support means having means for locking same in adjusted positions.

6 Claims, 5 Drawing Figures

PATENTED APR 23 1974　　　　　　　　　　　　　　　　　　　3,805,647
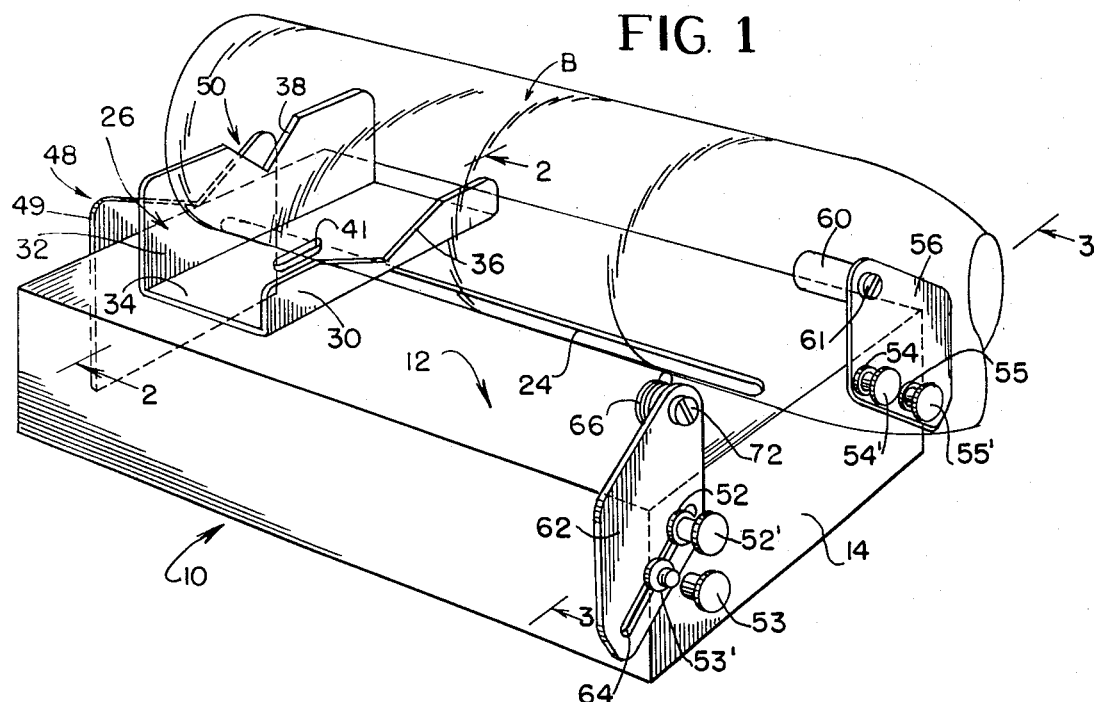
FIG. 1
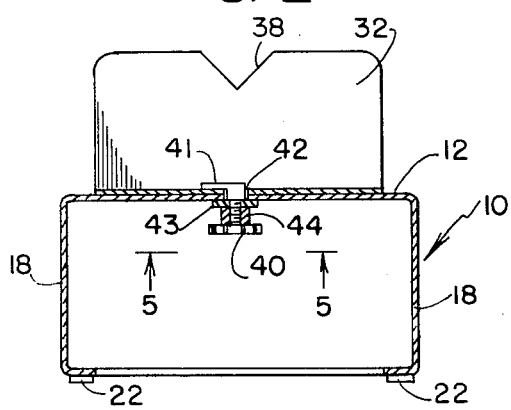
FIG. 2
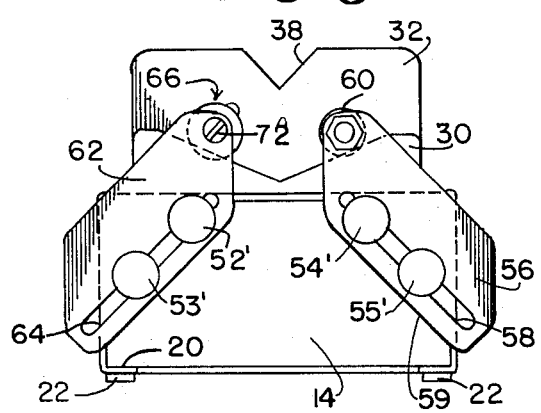
FIG. 3
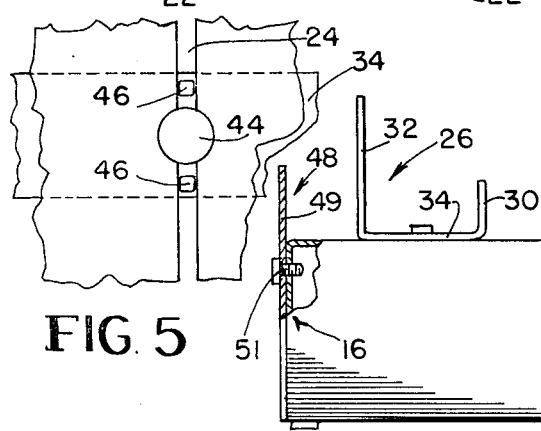
FIG. 5　　FIG. 4
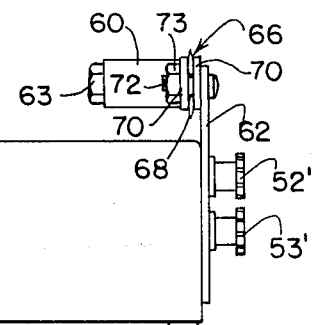

DEVICE FOR CUTTING HOLLOW CYLINDRICAL OBJECTS SUCH AS BOTTLES AND THE LIKE

BRIEF SUMMARY OF THE INVENTION

The object of the present invention is to provide a device in which a hollow cylindrical object such as a glass bottle and the like is horizontally supported so that as the cylindrical object is manually rotated the cutting element on the front support means is engaged and makes a circular score line on the cylindrical object, that is, the glass is etched along said score line. The characteristic feature forming this invention with respect to such a device is in providing the front support means with a pair of spaced wing-like members which are adjustable relative to each other so that the wing-like members may be manually moved inwardly and upwardly relative to each other and locked in their adjusted position. The purpose of providing such a pair of wing-like adjustable members for the front support is to accommodate and score cylindrical objects having different diameters, as well as to score at the taper of the bottle, in contrast to structures which do not have spaced adjustable front support and cutting means. In cutting or scoring a bottle along the circular body thereof the front support means would have to be positioned farther apart from each other in contrast to cutting or scoring the bottle along the reduced neck portion. Therefore, by the adjustable front support wings forming this invention a generally hollow cylindrical object may be supported and scored and/or etched along any portion of either the greatest or smallest diameter with the adjustable front support wings accommodating the various sized objects.

BRIEF DESCRIPTION OF THE DRAWINGS

In the drawings:

FIG. 1 is a perspective view of the invention with a cylindrical bottle positioned thereon for scoring and showing particularly the adjustable front support means, with one of said support means carrying the cutting element which forms the circular score or etching on the bottle;

FIG. 2 is a view partly in section taken on line 2—2 of FIG. 1;

FIG. 3 is a front elevational view taken on line 3—3 of FIG. 1;

FIG. 4 is a side elevational view of the device, and

FIG. 5 is a plan view taken on line 5—5 of FIG. 2.

The device comprises a base generally indicated at 10 which has a horizontal flat top wall 12, a downwardly extending front wall 14, a downwardly extending rear wall 16 spaced from the front wall 14, and downwardly extending spaced side walls 18, all suitably interconnected to form an integral base. The undersides of the front, back and side walls are turned inwardly to form horizontal flanges 20 and rubber legs 22 are secured to the underside of said flanges so that the base may rest on a supporting surface such as a table or the like. The top horizontal wall 12 of the base is provided with a centrally positioned longitudinal slot 24.

The device includes a rear support means generally designated by the numeral 26 and a front support and cutting means generally designated by the numeral 28. The rear support means 26 is slidably supported on the top wall 12 of the base 10 and is slidable axially with respect to the front support and cutting means. The rear support means 26 comprises an integrally formed member having a pair of upright or vertical walls 30 and 32 connected by a bottom connecting horizontal wall 34 spacing the vertical walls from each other.

It will be noted that the front wall 30 is shorter in height than the rear wall 32. The terms front and rear are in reference to the position shown in the drawing. The front wall 30 is provided with a V-shaped cutout or V-shaped recess 36 and the rear wall 32 which extends upwardly of the front wall and rearwardly thereof is also provided with a V-shaped cutout or V-shaped recess 38. The angle of the cutout 38 on the rear upright wall 32 is approximately 90°, whereas the angle of the cutout 36 on the front wall 30 is greater.

As can best be seen in FIG. 2, an externally threaded stud or screw 40 is brazed or otherwise secured as at 41 to the bottom wall 34 of the rear support 26 and said stud or screw extends through an opening 42 in the bottom wall and extends through the elongated slot 24 in the top wall 12 of the base 10. A washer 43 fits on the screw 40 and a screw cap 44 is threaded into engagement with the stud or screw 40, with said cap positioned on the underside of the top wall to engage same so that when the cap is tightened relative to the stud and rear support member 26 is positioned in locked position relative to the base support. The underside of the bottom wall 34 (FIG. 5) has spaced alined projections 46 which extend into the longitudinal slot 24 and prevent the rear support member 26 from turning relative to the base 10 but permits the axial sliding movement thereon. It will be seen that by manually loosening the cap 44 and rear support means 26 may be manually slid axially on said base and when positioned in its proper axially adjusted position the cap 44 is tightened to maintain the rear support 26 in adjusted position.

The purpose of providing the rear support means with a pair of spaced upright walls 30 and 32 with different V-shaped recesses is to provide support for cylindrical objects such as bottles with different diameters. Also, the rear wall 32 is used when the bottle is candled, as will be subsequently described herein.

The rear wall 16 of the base 10 also supports a fixed rear support generally designated at 48 which comprises a plate 49 which has a V-shaped recess or cutout 50. The plate 49 is secured by suitable fastening elements 51 to the rear wall 16 and serves as a fixed rear support for a bottle or cylindrical object which is longer than can be supported on the slidable rear support 26 previously described. To use the fixed rear support 48 for supporting one end of a bottle, the slidable support 26 is removed from the base.

The front wall 14 of the base 10 has fixed to it a pair of spaced externally threaded studs or screws 52 and 53 adjacent one side, with said studs diagonally positioned so that the lower stud 53 is below and laterally of the upper stud 52. A similar pair of threaded studs 54 and 55 are positioned adjacent the opposite side on the front wall. In other words, the front wall has a pair of spaced studs adjacent each side thereof and said studs are correspondingly spaced and positioned.

Slidably and adjustably supported on the spaced studs or screws 54 and 55 is a plate 56 of generally parallelogram shape, which is sometimes hereinafter referred to as a slidable wing member. The plate 56 is provided with a longitudinal slot 58 adjacent the lower end, which slot is parallel to the bottom edge 59 of the plate and the slot is inclined at an angle of approximately 45° with respect to the horizontal. The slot 58 of the plate or wing member 56 engages the studs or screws 54 and 55 and the plate is supported thereon and is slidable with respect thereto. Each of the studs or screws 54 and 55 supports a washer and a threaded cap, which caps are designated respectively as 54' and 55' and which when tightened against the plate or wing 56 serve to maintain the wing element in adjusted position. A roller 60 is rotatably and horizontally supported on said wing adjacent the top thereof by a post 61 which extends through an opening in the upper wing portion. The end of the post is threaded and is secured to the wing by a threaded nut 63.

The other adjustable member forming the front support means comprises a plate 62 shaped similar to plate 56 and said second plate 62 is likewise sometimes hereinafter referred to as a slidable wing member. The said wing member 62 is provided with an inclined slot 64, similar to slot 58, so that the plate or wing 62 is supported and slides on the threaded studs 52 and 53 adjacent the opposite side of the front wall. Said studs are likewise provided with manually engageable screw caps 52' and 53' which when tightened position the wing 62 in its slid adjusted position.

A cutting, scoring or etching member generally designaged by the numeral 66 is supported adjacent the upper inner end of the slidable wing member 62. The cutting member 66 may be of any conventional form and said cutting or scoring member has spaced cutting surfaces 68 projecting outwardly and positioned between a pair of spaced disks 70. The cutting surfaces and the spaced disks form an integral unit. The cutting member is supported on a short horizontally positioned post 72 secured to and extending through an opening in the wing member 62 as well as through the circular disks 70 of the cutting member and is secured by a suitable nut 73 at the end thereof. The bottle or other cylindrical object B to be cut is horizontally positioned so that one end, preferably the rear of the bottle rests in the recess 36 of the rear support means 26, with the front of the bottle resting on the roller 60 of the adjustable front wing support 56 and also resting on and engaging the cutting element 66. As the bottle is manually rotated the cutting member 66 scores or etches a circular line on the glass bottle B and this forms the line where the bottle is severed or broken away from the remainder.

The significant part of this invention is in the provision of the slidable and adjustable front wing members 56 and 62 which forms the front support for the cylindrical object supported thereon. FIGS. 2 and 3 show the wings 56 and 62 adjusted to almost their outermost separated position to support a bottle of the diameter shown in FIG. 1. If the diameter of the bottle is smaller, then the wing members 56 and 62 are slid inwardly towards each other which due to the inclined or diagonal slots 58 and 64 also causes the wings to move upwardly. The wings 56 and 62 are thus adjustable inwardly and upwardly or downwardly and outwardly from that shown. The locking nuts 52', 53' and 54', 55' lock the wings in their adjusted position. Thus, bottles and the tapered portions thereof such as bottle necks, etc., having various diameters can be readily positioned by virtue of the front adjustable support and cutting means supported on the adjustable wings 56 and 62.

To provide a rear support for a longer bottle, the slidable rear support 26 is removed and the end of the bottle is supported on the stationary rear support 48.

After the bottle has been scored, as hereinbefore described in connection with this invention, the portion of the bottle extending outwardly of the score line may be removed from the balance of the bottle by positioning the end of the bottle to be removed in the recess 38 of the stationary rear upright 32 so that it extends rearwardly of the base 10 and placing the tip of a lighted candle so that the flame is against the scored or etched circular line on the bottle and rotating the bottle for about 1/2 minute and then placing the bottle in a bucket of cold water or ice, which will cause the bottle to separate along the scored line.

With this invention, wine, beer, cooking oil, syrup bottles and jugs can be scored and cut to convert same into vases, goblets, candy dishes and other objects.

What is claimed is:

1. A device for cutting a hollow cylindrical object such as a glass bottle and the like comprising, a base, rear support means and front support means axially spaced from each other, said rear and front support means adapted to horizontally support the cylindrical object, said front support means comprising a pair of spaced upright members each of which is independently adjustable with respect to the base and in respect to each other, each of said upright members being of a generally parallelogram shape and each having an inclined slot cooperating with means on the front of the base whereby said spaced upright members are slidable and adjustable upwardly and inwardly toward each other and downwardly and outwardly from each other, at least one of said front support members having a cutter engageable with the cylindrical member during rotation of the cylindrical member to form a circular score line.

2. A device as set forth in claim 1 in which a roller is supported on the other spaced upright member.

3. A device as set forth in claim 1 in which the rear support means comprises an upright plate with a recess in said plate to receive one end of the cylindrical object for supporting same.

4. A device as set forth in claim 1 in which the rear support means comprises a pair of spaced upwardly extending front and rear members connected together, with said rear member extending upwardly of the front member and with each of said members having a recess adapted to receive the end of the cylindrical object.

5. A device as set forth in claim 1 in which the base comprises a top horizontal wall and a front wall and a rear wall extending downwardly from the top horizontal wall, with said front and rear walls spacing the top wall from a supporting surface on which same rests, said top wall having a longitudinal slot, said rear support means cooperating with said longitudinal slot for permitting movement of said rear support means axially with respect to said front support means, and means for locking said rear support means in any adjusted position on said base.

6. A device for cutting a hollow cylindrical object such as a glass bottle and the like comprising, a base having a front wall member, rear support means and front support means axially spaced from each other, said rear and front support means adapted to horizontally support the cylindrical object, said front support means comprising a pair of spaced upright members each of which is independently adjustable with respect to the base and in respect to each other, each of said upright members being of a generally parallelogram shape, said front wall member and upright members having cooperating means, namely, inclined slots on one and a stud on the other cooperating with said slots whereby said spaced upright members are slidable and adjustable upwardly and inwardly toward each other and downwardly and outwardly from each other, at least one of said front support members having a cutter engageable with the cylindrical member during rotation of the cylindrical member to form a circular score line.

* * * * *